United States Patent
Kabe et al.

(10) Patent No.: US 6,865,069 B2
(45) Date of Patent: Mar. 8, 2005

(54) NIOBIUM POWDER, SINTERED BODY THEREOF, CHEMICALLY MODIFIED PRODUCT THEREOF AND CAPACITOR USING THEM

(75) Inventors: Isao Kabe, Chiba (JP); Kazumi Naito, Chiba (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/463,815

(22) Filed: Jun. 18, 2003

(65) Prior Publication Data

US 2004/0037023 A1 Feb. 26, 2004

Related U.S. Application Data

(63) Continuation-in-part of application No. 10/260,540, filed on Oct. 1, 2002, and a continuation-in-part of application No. PCT/JP02/10231, filed on Oct. 1, 2002.
(60) Provisional application No. 60/326,735, filed on Oct. 4, 2001.

(30) Foreign Application Priority Data

Oct. 2, 2001 (JP) .................................... P2001-305907

(51) Int. Cl.$^7$ ............................................... H01G 9/04
(52) U.S. Cl. ..................................... 361/508; 361/504

(58) Field of Search ................................. 361/508, 524, 361/516, 525, 504; 501/137–139

(56) References Cited

U.S. PATENT DOCUMENTS 3,847,658 A * 11/1974 Kumagai ..................... 428/432
5,128,289 A * 7/1992 Wilson ........................ 501/137
6,115,235 A 9/2000 Naito
6,409,796 B1 * 6/2002 Surpin .......................... 75/255

FOREIGN PATENT DOCUMENTS

JP 10-242004 A 9/1998

OTHER PUBLICATIONS

International Search Report for PCT/JP02/10231.

* cited by examiner

Primary Examiner—Anthony Dinkins
(74) Attorney, Agent, or Firm—Sughrue Mion, PLLC

(57) ABSTRACT

The invention relates to a niobium powder capable of providing a capacitor having small amounts of leakage current, wherein the average nitrogen concentration in the layer of 50 to 200 nm from the surface to 0.29 to 4% by mass and preferably controlling that in the depth within 50 nm from the surface to 0.19 to 1% by mass, the sintered body, the formed body and the capacitor using the same.

20 Claims, No Drawings

NIOBIUM POWDER, SINTERED BODY THEREOF, CHEMICALLY MODIFIED PRODUCT THEREOF AND CAPACITOR USING THEM

CROSS REFERENCE TO RELATED APPLICATIONS

This application is a continuation-in-part application of U.S. application Ser. No. 10/260,540, filed Oct. 1, 2002, which claims benefit of U.S. Provisional Application No. 60/326,735, filed Oct. 4, 2001, and is a continuation-in-part application of PCT/JP02/10231, filed Oct. 1, 2002, which claims benefit of U.S. Provisional Application No. 60/326, 735. filed Oct. 4, 2001, all of which are herein incorporated by reference.

TECHNICAL FIELD

The present invention relates to a niobium powder, a sintered body thereof, a niobium sintered body (also referred to as formed body) on the surface of which a dielectric material is provided, and a capacitor using the same.

BACKGROUND ART

A general method of producing a niobium capacitor from a niobium powder is as follows. First, a molded article of a niobium powder is produced with a niobium lead wire inserted therein. Next, by heating the molded article, a porous niobium sintered body is obtained wherein the niobium powders to each other and the lead wire and the surrounding niobium powder are sintered and electrically integrated. Furthermore, voltage is applied to the niobium sintered body wherein the lead wire side functions as an anode to anodize (also referred to as "form") the sintered body and form a dielectric material film of niobium oxide on the surface thereof (including the inside surface of the pores). Then a cathode material such as manganese dioxide is charged into the space of pores of the niobium sintered body in a shape of a three-dimensional net. Furthermore, after laminating an electrically conductive paste on the surface of the niobium formed body, the niobium formed body is fixed on a lead frame and the whole is sealed with resin to obtain a capacitor.

A defect of a niobium capacitor is to have a large amount of leakage current flowing through the dielectric material film when a voltage is applied. This arises from the nature of niobium ready to take in the oxygen in the air.

When sintering the niobium incorporating oxygen, a niobium dioxide crystal is produced which is electrically conductive. Anodizing niobium generally produces an amorphous niobium oxide film on the surface of niobium, while anodizing niobium including a niobium oxide crystal produces an amorphous niobium oxide film containing crystalline niobium oxide. That is, the dielectric film of amorphous niobium oxide includes lots of conductors in the form of microcrystals. As a result, the leakage current of a capacitor increases and lowers the reliability.

The methods have been studied to reduce the leakage current of a niobium capacitor, and a technology has been developed to nitride the niobium powder and niobium sintered body. However, those methods have not necessarily reached to a level demanded by the market.

DISCLOSURE OF THE INVENTION

An object of the present invention is to provide a niobium powder that enables to provide a capacitor having a small amount of leakage current, a niobium sintered body, a formed body and a capacitor using the same.

To solve the above problems, the present inventors made extensive investigations on the nitrogen concentration on the surface and inside of the niobium particle. As a result the present inventors have found that the leakage current of the niobium capacitor is reduced than that of a conventional capacitor by controlling the average nitrogen concentration in the niobium particle to 0.29 to 4% by mass in the layer of 50 to 200 nm from the surface and preferably to 0.19 to 1% by mass in the layer within 50 nm from the surface and accomplished the present invention.

The reason why the leakage current is reduced than that of a conventional capacitor is assumed as follows.

When niobium is anodized, a dielectric film of niobium oxide is formed on the surface of niobium and giving a structure comprising niobium in the core and a niobium oxide layer on the surface. The niobium in the core functions as an anode and the niobium oxide layer as a dielectric material film of a capacitor.

There are two kinds of nitrogen present in the niobium in the core, that is, nitrogen solved in the crystal lattice of niobium and nitrogen having covalent bond (hereinafter simply referred to as "bond") with niobium. The nitrogen solved in the crystal lattice of niobium inhibits the oxygen of the niobium oxide layer from being diffused into the niobium layer. Also, the nitrogen bonded with niobium inhibits the oxygen of the niobium oxide layer from being bonded with the niobium in the core. Accordingly, the two kinds of nitrogen present in the niobium core have an effect to reduce the leakage current of the capacitor.

On the other hand, there are two kinds of nitrogen present in the niobium oxide layer, that is, nitrogen solved in the crystal lattice of niobium oxide and nitrogen bonded with niobium. The nitrogen solved in the crystal lattice of niobium oxide inhibits the oxygen of the niobium oxide layer from being diffused into the niobium core. However, nitrogen bonded with niobium forms a crystal of electrically conductive niobium nitride and thereby increases the leakage current. Accordingly, the nitrogen present in the niobium oxide layer has a different effect on the leakage current depending on the status of bonding.

Therefore, the leakage current of a niobium capacitor can be reduced by increasing the nitrogen concentration of niobium core and decreasing that of the niobium oxide layer.

More specifically, the present invention relates to the following invention.

(1) A niobium powder containing nitrogen, wherein the average nitrogen concentration in the depth of 50 to 200 nm from the surface of the niobium particle is 0.29 to 4 mass %.

(2) The niobium powder as described in 1 above, wherein the average nitrogen concentration in the depth within 50 nm from the surface of the particle is 0.19 to 1 mass %.

(3) The niobium powder as described in 1 or 2 above, wherein the average particle size is from 0.1 to 1000 μm.

(4) The niobium powder as described in any one of 1 to 3 above, wherein the BET specific surface area is from 0.5 $m^2/g$ to 40 $m^2/g$.

(5) The sintered body using the niobium powder described in any one of 1 to 4 above.

(6) The sintered body wherein a dielectric material mainly comprising a niobium oxide is formed by anodic oxidation on the surface of the sintered body described in 5 above.

(7) A capacitor comprising the niobium sintered body described in 5 above as one electrode, a dielectric material mainly comprising a niobium oxide formed on the surface of the sintered body, and the counter electrode provided on the dielectric material.

(8) The capacitor as described in 7 above, wherein the material of the counter electrode is at least one member selected from the group consisting of an electrolytic solution, an organic semiconductor and an inorganic semiconductor.

(9) The capacitor as described in 8 above, wherein the material of the counter electrode is an organic semiconductor and the organic semiconductor is at least one member selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an electrically conducting polymer.

(10) The capacitor as described in 9 above, wherein the electrically conducting polymer is at least one member selected from polypyrrole, polythiophene, polyaniline and substitution derivatives thereof.

(11) The capacitor as described in 9 above, wherein the electrically conducting polymer is an electrically conducting polymer obtained by doping a dopant into a polymer comprising a repeating unit represented by the following formula (1) or (2):

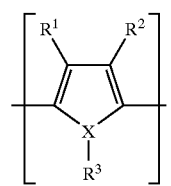

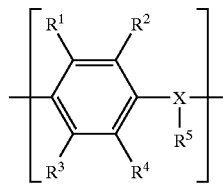

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of the pair of $R^1$ and $R^2$ and the pair of $R^3$ and $R^4$ may combine to each other at an arbitrary position to form a divalent chain for forming at least one 3-, 4-, 5-, 6- or 7-membered saturated or unsaturated hydrocarbon cyclic structure together with the carbon atoms substituted by these groups; the cyclic bond chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents hydrogen or a linear or branched, saturated or unsaturated alkyl group having from 1 to 10 carbon atoms.

(12) The capacitor as described in 11 above, wherein the electrically conducting polymer is an electrically conducting polymer comprising a repeating unit represented by the following formula (3):

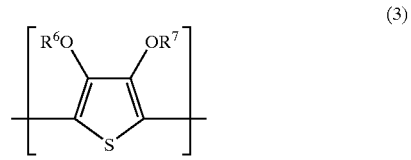

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position and the cyclic structure includes a structure having a vinylene bond which may be substituted and a phenylene structure which may be substituted.

(13) The capacitor as described in 12 above, wherein the electrically conducting polymer is an electrically conducting polymer obtained by doping a dopant to poly(3,4-ethylenedioxythiophene).

(14) The capacitor as described in 7 above, wherein the counter electrode is formed of an electrically conducting polymer material having a layer structure at least partially.

(15) The capacitor as described in 7 above, wherein the counter electrode is formed of a material containing an organic sulfonate anion as a dopant.

(16) A capacitor comprising a niobium sintered body as one electrode, a dielectric material mainly comprising a niobium oxide formed on the surface of the sintered body, and the counter electrode provided on the dielectric material, wherein the average nitrogen concentration is 0.29 to 4 mass % in the parts except the dielectric film mainly comprising the niobium sintered body as one electrode.

(17) A capacitor described in 16 above, wherein the average nitrogen concentration is 0.19 to 1 mass % in the dielectric film mainly comprising the niobium sintered body.

(18) A method of producing the niobium powder containing nitrogen described in any one of 1 to 4, which is characterized in comprising a step of heating the niobium powder in an inert gas atmosphere.

(19) The method of producing the niobium powder described in 18 above, comprising a step of heating the niobium powder in vacuo.

(20) The method of producing the niobium powder described in 18 above, wherein the inert gas is argon.

EMBODIMENT OF THE INVENTION

The niobium powder used as a starting material of niobium capacitors (hereinafter simply referred to as a niobium powder) includes primary particles, secondary particles resulting from agglomerating primary particles and/or tertiary particles resulting from agglomerating secondary particles (hereinafter referred to as tertiary particles). The average particle size of these particles is usually within the range of 0.1 to 1000 μm.

Examples of the method for producing a primary particle having an average particle size of 0.01 to 50 μm include a method of pulverizing a hydrogenated niobium powder. To obtain a hydrogenated niobium powder, a niobium powder produced by a known method (having an average particle size of 0.5 to 100 μm) and niobium ingot are used. A pulverizing device includes a jet mill, for example. By dehydrogenating the niobium powder after pulverization, primary particles usable in the present invention are obtained.

The secondary particles comprising a few to hundreds of agglomerated primary particles can be prepared by allowing the above-described primary particles to stand in an atmosphere at an appropriate temperature, by cracking after the standing or by further classifying the particles after the cracking. The secondary particles can be produced to have any average particle size, however, secondary particles having an average particle size of 0.03 to 20 μm are usually used. In the case where the primary particles are obtained by the above-described jet mill method, the secondary particles can be produced in the jet mill vessel or another vessel connected with the jet mill without taking out the primary particles from the jet mill vessel to the outside and so that excess oxidation can be advantageously prevented.

Other methods to obtain secondary particles for a capacitor having an average particle size of 0.2 to 1000 μm resulting from agglomeration of several to hundreds of primary particles include, for example, (1) reducing niobium halide with alkali metal, alkaline earth metal or carbon, (2) reducing niobium pentoxide with alkali metal, alkaline earth metal, carbon or hydrogen, (3) reducing potassium niobium fluoride with alkali metal and (4) electrolyzing potassium niobium fluoride with a molten salt (NaCl+KCl) on a nickel cathode. (5) a so-called continuous method of halogenating niobium metal and further continuously hydrogen-reducing the halogenated niobium metal may also be used.

The specific surface area of the secondary niobium particles obtained by the above-described two methods can be freely changed, however, secondary niobium particles having a specific surface area of 0.5 to 40 m$^2$/g are usually used.

Tertiary particles are obtained by further granulating the above-described secondary agglomerated particles to an appropriate size. Known methods can be used for the granulation. Examples of the method include a method where powder particles are left standing at a high temperature of 500 to 2,000° C. in a vacuum and then wet or dry cracked, a method where powder particles are mixed with an appropriate binder such as acrylic resin or polyvinyl alcohol and then cracked, and a method where powder particles are mixed with an appropriate compound such as acrylic resin, camphor, phosphoric acid or boric acid, left standing at a high temperature in a vacuum and then wet or dry cracked.

The particle size of the tertiary particles can be freely controlled by the degree of granulation and cracking, however, tertiary particles having an average particle size of 0.4 to 1000 μm are usually used. The tertiary particles may be classified after the granulation and cracking. After the granulation, the tertiary particles may also be mixed with an appropriate amount of powder particles before the granulation or with an appropriate amount of tertiary particles having a plurality of average particle sizes. The specific surface area of the thus-produced tertiary particles can be freely adjusted, however, tertiary particles having a specific surface area of 0.3 to 20 m$^2$/g are usually used.

The niobium powder of the present invention usually includes 0.05 to 9% by mass oxygen through natural oxidation, though it varies depending on the particle size. To decrease leakage current of a capacitor, the oxygen content is preferably 9% by mass or less. When a capacitor is produced using a niobium powder having an oxygen content of more than 9% by mass, it may not be suitable for pracitical use because of a large amount of leakage current.

When the oxygen concentration in the niobium powder is more than 9% by mass, it can be reduced, for example, by mixing the niobium powder with a metal powder which is more easily oxidizable than niobium and heating the mixture in vacuo. As a method to separate a mixed metal powder and oxide thereof from the niobium powder after reducing the oxygen concentration includes classification using the difference of the particle size, selectable etching by acid or alkaline, etc. may be used.

The average nitrogen concentration of the present niobium powder is uneven from the surface to the depth, and it is important that it is 0.29 to 4% by mass in the layer of 50 to 200 nm from the surface. A capacitor produced from a niobium powder having an average nitrogen concentration out of this range has a large amount of leakage current.

The average nitrogen concentration of the present niobium powder is preferably 0.19 to 1% by mass in the depth within 50 nm from the surface. By controlling the average nitrogen concentration within this range, the leakage current of a capacitor can be further reduced.

In the niobium powder of the present invention, the average nitrogen concentration in the part more than 200 nm from the surface is generally lower than that in the part nearer to the surface.

The niobium powder having an average nitrogen concentration within the above-described range can be obtained, for example, by heating a niobium powder at 200 to 1,000° C. under nitrogen atmosphere. Preferably, the niobium powder heated in the nitrogen atmosphere is further heated in an inert gas atmosphere, for example, in argon at 200 to 1,000° C. More preferably, the niobium powder heated in the nitrogen atmosphere and argon atmosphere is heated in vacuo at 200 to 1,000° C. Still more preferably, the niobium powder is not allowed to contact with oxygen during or between the heating steps. According to these methods, the average nitrogen concentration and distribution can be controlled by adjusting the heating temperature, heating time and the gas pressure.

Other methods to control the average nitrogen concentration include, for example, a method of implanting the nitrogen ion accelerated by an ion gun into the inside of the niobium powder. This method allows controlling the average nitrogen concentration by adjusting the accelerating voltage and the number of ions.

Methods to measure the nitrogen concentration according to the depth of the niobium particle include, for example, measuring the niobium distribution of the niobium plate nitrided in the similar way of the niobium powder by Auger Electron Spectroscopy (AES) to determine the niobium distribution of the niobium powder. It is because that the nitrogen distribution in the niobium powder is assumed to be the same as that in the niobium plate nitrided in the similar way.

The niobium sintered body of the present invention is produced by sintering the above-described niobium powder (preferably secondary or tertiary particles). The production method of the sintered body is not particularly limited but, for example, the niobium particles are press-molded into a predetermined shape and then heated at 500 to 2,000° C. for one minute to ten hours under a reduced pressure of $10^{-5}$ to $10^{-2}$ Pa or in an inert gas such as argon, thereby producing a sintered body.

A lead wire comprising a valve-acting metal such as niobium or tantalum may be prepared to have an appropriate shape and an appropriate length and integrally molded at the above-described press-molding of niobium powder such that a part of the lead wire is inserted into the inside of the molded article, whereby the lead wire can be designed to work out to a leading line of the sintered body. The specific surface area of the thus-produced niobium sintered body of the present invention can be freely adjusted, however, a niobium sintered body having a specific surface area of from 1 to 10 m²/g is usually used.

A capacitor can be produced comprising the above-described sintered body as one electrode and a dielectric material interposed between the sintered body and the counter part electrode.

The dielectric material for the capacitor is preferably a dielectric material mainly comprising niobium oxide. The dielectric material mainly comprising niobium oxide can be obtained by chemically forming (anodizing) the niobium sintered body as one electrode in an electrolytic solution. For chemically forming the niobium electrode in an electrolytic solution, an aqueous protonic acid solution is generally used, such as aqueous 0.1% phosphoric acid solution, aqueous sulfuric acid solution or aqueous 1% acetic acid solution, aqueous adipic acid solution, etc. In the case of obtaining a dielectric material comprising niobium oxide by chemically forming the niobium electrode in an electrolytic solution, the capacitor of the present invention is an electrolytic capacitor and the niobium side serves as an anode.

It is important that the niobium powder for the niobium capacitor of the present invention contains nitrogen of 0.29 to 4% by mass concentration in average in the part except the dielectric film. In case when the average nitrogen concentration is out of the range, the leakage current increases.

Furthermore, it is preferable that the average nitrogen concentration of the dielectric material film of the present niobium capacitor is 0.19 to 1% by mass. By controlling the average nitrogen concentration within this range, the leakage current of the niobium capacitor is further reduced.

In the capacitor of the present invention, the counter electrode is not particularly limited and for example, at least one material (compound) selected from electrolytic solutions, organic semiconductors and inorganic semiconductors known in the art of aluminum electrolytic capacitor, can be used.

Specific examples of the electrolytic solution include a dimethylformamide-ethylene glycol mixed solution having dissolved therein 5% by mass of isobutyl-tripropylammonium borotetrafluoride electrolyte, and a propylene carbonate-ethylene glycol mixed solution having dissolved therein 7% by mass of tetraethylammonium borotetrafluoride.

Specific examples of the organic semiconductor include an organic semiconductor comprising a benzopyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer containing a repeating unit represented by formula (1) or (2):

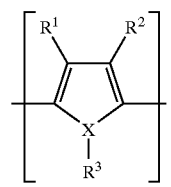

(1)

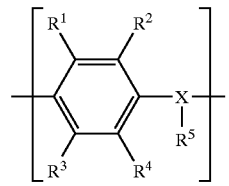

(2)

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of the pair of $R^1$ and $R^2$ and the pair of $R^3$ and $R^4$ may combine to each other at an arbitrary position to form a divalent chain for forming at least one 3-, 4-, 5-, 6- or 7-membered saturated or unsaturated hydrocarbon cyclic structure together with the carbon atoms substituted by these groups; the cyclic bond chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents hydrogen or a linear or branched, saturated or unsaturated alkyl group having from 1 to 10 carbon atoms.

Moreover, in the above formula (1) or (2) of the present invention, it is preferable that $R^1$ to $R^4$ each independently represents a hydrogen atom, a linear or branched, saturated or unsaturated alkyl or alkoxy group having from 1 to 6 carbon atoms; and the hydrocarbon chains of the pair of $R^1$ and $R^2$ and the pair of $R^3$ and $R^4$ may combine to each other to form a ring.

In the present invention, the electrically conducting polymer comprising a repeating unit represented by the formula (1) is preferably an electrically conducting polymer comprising a repeating unit represented by the following formula (3):

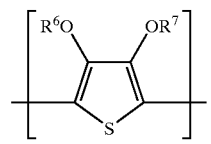

(3)

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position and the cyclic structure includes a structure having a vinylene bond which may be substituted and a phenylene structure which may be substituted.

The electrically conducting polymer containing such a chemical structure is electrically charged and a dopant is doped thereto. For the dopant, known dopants can be used without limitation.

Specific examples of the inorganic semiconductor include an inorganic semiconductor mainly comprising lead dioxide or manganese dioxide, and an inorganic semiconductor comprising tri-iron tetroxide. These semiconductors may be used individually or in combination of two or more thereof.

Examples of the polymer containing a repeating unit represented by formula (1) or (2) include polyaniline, polyoxyphenylene, polyphenylene sulfide, polythiophene, polyfuran, polypyrrole, polymethylpyrrole, and substitution derivatives and copolymers thereof. Among these, preferred are polypyrrole, polythiophene and substitution derivatives thereof (e.g., poly(3,4-ethylenedioxythiophene)).

When the organic or inorganic semiconductor used has an electrical conductivity of $10^{-2}$ to $10^3$ S/cm, the produced capacitor can have a smaller impedance value and a larger capacitance at a high frequency.

The electrically conducting polymer layer is produced, for example, by a method of polymerizing a polymerizable compound such as aniline, thiophene, furan, pyrrole, methylpyrrole or a substitution derivative thereof under the action of an oxidizing agent capable of satisfactorily undergoing an oxidation reaction of dehydrogenative two-electron oxidation. Examples of the polymerization reaction from the polymerizable compound (monomer) include vapor phase polymerization and solution polymerization. The electrically conducting polymer layer is formed on the surface of the niobium sintered body having thereon a dielectric material. In the case where the electrically conducting polymer is an organic solvent-soluble polymer capable of solution coating, a method of coating the polymer on the surface of the sintered body to form an electrically conducting polymer layer is used.

One preferred example of the production method using the solution polymerization is a method of dipping the niobium sintered body having formed thereon a dielectric layer in a solution containing an oxidizing agent (Solution 1) and subsequently dipping the sintered body in a solution containing a monomer and a dopant (Solution 2), thereby performing the polymerization to form an electrically conducting polymer layer on the surface of the sintered body. Also, the sintered body may be dipped in Solution 1 after it is dipped in Solution 2. Solution 2 used in the above-described method may be a monomer solution not containing a dopant. In the case of using a dopant, the dopant may be allowed to be present together in the solution containing an oxidizing agent.

The operation of performing these polymerization steps is repeated once or more, preferably from 3 to 20 times, per the niobium sintered body having thereon a dielectric material, whereby a dense and stratified electrically conducting polymer layer can be easily formed.

In the production method of a capacitor of the present invention, any oxidizing agent may be used insofar as it does not adversely affect the capacitor performance and the reductant of the oxidizing agent can work out to a dopant and elevate the electrically conductivity of the electrically conducting polymer. An industrially inexpensive compound easy to handle at the production is preferred.

Specific examples of the oxidizing agent include Fe(III)-base compounds such as $FeCl_3$, $FeClO_4$ and Fe (organic acid anion) salt; anhydrous aluminum chloride/cuprous chloride; alkali metal persulfates; ammonium persulfates; peroxides; manganeses such as potassium permanganate; quinines such as 2,3-dichloro-5,6-dicyano-1,4-benzoquinone (DDQ), tetrachloro-1,4-benzoquinone and tetracyano-1,4-benzoquinone; halogens such as iodine and bromine; peracid; sulfonic acid such as sulfuric acid, fuming sulfuric acid, sulfur trioxide, chlorosulfuric acid, fluorosulfuric acid and amidosulfuric acid; ozone; and a mixture of a plurality of these oxidizing agents.

Examples of the fundamental compound of the organic acid anion for forming the above-described Fe (organic acid anion) salt include organic sulfonic acid, organic carboxylic acid, organic phosphoric acid and organic boric acid. Specific examples of the organic sulfonic acid include benzenesulfonic acid, p-toluenesulfonic acid, methanesulfonic acid, ethanesulfonic acid, α-sulfo-naphthalene, β-sulfonaphthalene, naphthalenedisulfonic acid and alkyl-naphthalenesulfonic acid (examples of the alkyl group include butyl, triisopropyl and di-tert-butyl).

Specific examples of the organic carboxylic acid include acetic acid, propionic acid, benzoic acid and oxalic acid. Furthermore, polymer electrolyte anions such as polyacrylic acid, polymethacrylic acid, polystyrene-sulfonic acid, polyvinylsulfonic acid, poly-α-methylsulfonic acid, polyvinylsulfuric acid and polyethylenesulfonic acid and polyphosphoric acid may also be used in the present invention. These organic sulfuric acids and organic carboxylic acids are mere examples and the present invention is not limited thereto. Examples of the counter cation to the above-described anion include alkali metal ions such as $H^+$, $Na^+$ and $K^+$, and ammonium ions substituted by a hydrogen atom, a tetramethyl group, a tetraethyl group, a tetrabutyl group or a tetraphenyl group, however, the present invention is not limited thereto. Among these oxidizing agents, preferred are oxidizing agents containing a trivalent Fe-base compound, cuprous chloride, an alkali persulfate, an ammonium persulfate or a quinone.

For the anion having a dopant ability which is allowed to be present together, if desired, in the production of a polymer composition for the electrically conducting polymer (anion other than the reductant anion of the oxidizing agent), an electrolyte anion having as a counter anion an oxidizing agent anion (a reductant of oxidizing agent) produced from the above-described oxidizing agent, or other electrolyte anion may be used. Specific examples thereof include protonic acid anions including halide anion of Group 5B elements such as $PF_6^-$, $SbF_6^-$ and $AsF_6^-$; halide anion of Group 3B elements such as $BF_4^-$; halogen anion such as $I^-(I_3^-)$, $Br^-$ and $Cl^-$; perhalogenate anion such as $ClO_4^-$; Lewis acid anion such as $AlCl_4^-$, $FeCl_4^-$ and $SnCl_5^-$; inorganic acid anion such as $NO_3^-$ and $SO_4^{2-}$; sulfonate anion such as p-toluenesulfonic acid, naphthalenesulfonic acid and alkyl-substituted naphthalenesulfonic acid having from 1 to 5 carbon atoms (hereinafter simply referred to as "C1–5"); organic sulfonate anion such as $CF_3SO_3^-$ and $CH_3SO_3^-$; and carboxylate anion such as $CH_3COO^-$ and $C_6H_5COO^-$.

Other examples include polymer electrolyte anions such as polyacrylic acid, polymethacrylic acid, polystyrene-sulfonic acid, polyvinylsulfonic acid, polyvinylsulfuric acid, poly-α-methylsulfonic acid, polyethylenesulfonic acid and polyphosphoric acid. However, the present invention is not limited thereto, Among these anions, preferred is a high molecular or low molecular organic sulfonic acid compound or polyphosphoric acid compound. Preferably, an aromatic sulfonic acid compound (e.g., sodium dodecylbenzenesulfonate, sodium naphthalenesulfonate) is used as the anion-donating compound.

Among the organic sulfonate anions, more effective dopants are a sulfoquinone compound having one or more sulfo-anion group ($—SO_3^-$) within the molecule and having a quinone structure, and an anthracene sulfonate anion.

Examples of the fundamental skeleton for the sulfoquinone anion of the above-described sulfoquinone compound include p-benzoquinone, o-benzoquinone, 1,2-naphthoquinone, 1,4-naphthoquinone, 2,6-naphthoquinone, 9,10-anthraquinone, 1,4-anthraquinone, 1,2-anthraquinone, 1,4-chrysenequinone, 5,6-chrysenequinone, 6,12- chrysenequinone, acenaphthoquinone, acenaphthenequinone, camphorquinone, 2,3-bornanedione, 9,10-phenanthrenequinone and 2,7-pyrenequinone.

In the case where the counter electrode is solid, an electrically conducting layer may be provided thereon so as to attain good electrical contact with an exterior leading line (for example, lead frame) which is used, if desired.

The electrically conducting layer can be formed, for example, by the solidification of an electrically conducting paste, the plating, the metallization or the formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or under heating.

Examples of the plating include nickel plating, copper plating, silver plating and aluminum plating. Examples of the metal vapor-deposited include aluminum, nickel, copper and silver.

More specifically, for example, carbon paste and silver paste are stacked in this order on the counter electrode and these are molded with a material such as epoxy resin, thereby fabricating a capacitor. This capacitor may have a niobium or tantalum lead which is sintered and molded integrally with the niobium sintered body or welded afterward.

The thus-fabricated capacitor of the present invention is jacketed using, for example, resin mold, resin case, metallic jacket case, dipping of resin or laminate film, and then used as a capacitor product for various uses.

In the case where the counter electrode is liquid, the capacitor fabricated comprising the above-described two electrodes and a dielectric material is housed, for example, in a can electrically connected to the counter electrode to complete the capacitor. In this case, the electrode side of the niobium sintered body is guided outside through a niobium or tantalum lead described above and at the same time, insulated from the can using an insulating rubber or the like.

BEST MODE FOR CARRYING OUT THE INVENTION

The present invention is described in greater details below by referring to Examples and Comparative Examples but is not particularly limited to the following examples.

The nitrided amount of the powder in each example was determined using a nitrogen-oxygen analyzer manufactured by LECO. It is assumed that the nitrogen distribution in the niobium powder is the same as that in the niobium plate nitrided in the similar way. Accordingly, the same nitridation treatment was applied to a separately prepared niobium plate in each Example or Comparative Example and the nitrogen distribution of the niobium plate was measured by Auger Electron Spectroscopy (AES) to determine the nitrogen distribution of the niobium powder.

EXAMPLE 1

A secondary powder (i.e. secondary particles) having an average particle size of 200 $\mu$m, BET specific surface area of 1.2 $m^2/g$ was granulated from a primary niobium powder (i.e. primary niobium particles) having an average particle size of 1 $\mu$m, BET specific surface area of 2 $m^2/g$. The secondary powder was heated in a high-frequency induction furnace and at 400° C. for one hour by passing nitrogen therethrough under atmospheric pressure and thereby nitrided. After the atomosphere in the furnace was purged with argon, the niobium powder was heated at 800° C. for two hours in the furnace and part of the nitrogen localized on the surface of the niobium powder was diffused into the inside of a niobium powder.

0.1 g of the secondary powder was measured and molded integrally with a niobium lead wire with a diameter of 0.3 mm and length of 10 mm. A molded article was produced having a size of 1.7 mm×3.3 mm×4.2 mm with a lead wire thrusting vertically 6 mm to the outside from the center of the base of the article (1.7 mm×3.3 mm).

The molded article was placed in the high-frequency induction furnace and after the inside of the furnace was drawn to a reduced pressure of $10^{-2}$ Pa the temperature was raised to 1200° C. for effecting sintering for 30 minutes.

The sintered body taken out of the furnace was dipped in an aqueous 0.1% phosphoric acid solution of 80° C. with the lead wire of the sintered body emerging above the solution surface. A separately prepared niobium plate was dipped in an aqueous phosphoric acid solution as a cathode and the lead wire was connected to the anode. The sintered body was electrochemically formed by anodic oxidation with an initial current density of 10 mA and keeping voltage of 20V for 3 hours after the voltage applied to the sintered body reached 20V to produce a formed body.

After impregnated with an aqueous 40% manganese nitrate solution, moisture was dried up from the formed body with anodic oxidation by heating at 105° C. and manganese nitrate was decomposed into manganese dioxide by further heating at 200° C. An operation of impregnation of an aqueous manganese nitrate solution and decomposition by heating was repeated to charge manganese dioxide as a cathode material and to form a counter electrode A carbon paste and silver paste were stacked in this order on the formed body charged with manganese dioxide. After mounting the formed body on a lead frame, the device as a whole was molded with an epoxy resin.

The result of measuring the leakage current of the obtained capacitor was 2 $\mu$A.

A niobium plate was nitrided in the high-frequency induction furnace with the secondary powder and etched by $Ar^+$ ion. From the result of the AES analysis of the etched surface, the average nitrogen concentration in the depth within 50 nm from the surface was 0.3% by mass and that in the depth of 50 to 200 nm from the surface was 0.3% by mass.

Also, a niobium plate was analyzed by AES, which was nitrided in the high-frequency induction furnace with the secondary powder and formed in the same way as of the sintered body in Example 1. As a result, the average nitrogen concentration was 0.3% by mass in the dielectric film and 0.3% by mass in the depth within 100 nm from the interface of the dielectric film.

COMPARATIVE EXAMPLE 1

A secondary powder having an average particle size of 200 $\mu$m, BET specific surface area of 1.2 $m^2/g$ was granulated from a primary niobium powder having an average particle size of 1 $\mu$m, BET specific surface area of 2 $m^2/g$. 0.1 g of the secondary powder was measured and molded integrally with a niobium lead wire with a diameter of 0.3 mm and length of 10 mm. A molded article was produced having a size of 1.7 mm×3.3 mm×4.2 mm with a lead wire thrusting vertically 6 mm to the outside from the center of the base of the article (1.7 mm×3.3 mm).

The molded article was placed in the high-frequency induction furnace and after the inside of the furnace was drawn to a reduced pressure of $10^{-2}$ Pa the temperature was raised to 1200° C. for effecting sintering for 30 minutes.

The sintered body taken out of the furnace was dipped in an aqueous 0.1% phosphoric acid solution of 80° C. with the lead wire of the sintered body emerging above the solution surface. A separately prepared niobium plate was dipped in an aqueous phosphoric acid solution as a cathode and the lead wire was connected to the anode. The sintered body was electrochemically formed by oxidizing anode with an initial current density of 10 mA and keeping voltage of 20V for 3 hours after the voltage applied to the sintered body reached 20V to produce a formed body.

After impregnated with an aqueous 40% manganese nitrate solution, moisture was dried up from the formed body with anode oxidation by heating at 105° C. and manganese nitrate was decomposed into manganese dioxide by further heating at 200° C. An operation of impregnation of an aqueous manganese nitrate solution and decomposition by heating was repeated to charge manganese dioxide as a cathode material and to form a counter electrode A carbon paste and silver paste were stacked in this order on the formed body charged with manganese dioxide. After mounting a lead frame on the formed body, the device as a whole was molded with an epoxy resin.

As a result of measurement after voltage of 6.3V was applied to the produced capacitor for one minute, the current through the capacitor (leakage current) was 62.3 µA.

The sintered body with anode oxidation was cut and the cross-section was observed by scanning electron microscope (SEM). As a result, the thickness of the dielectric film was 100 nm.

A niobium plate was etched by $Ar^+$ ion. From the result of the AES analysis of the etched surface, the average nitrogen concentration in the depth within 50 nm from the surface was 0.0% by mass and that in the depth of 50 to 200 nm from the surface was 0.0% by mass.

Also, a niobium plate was analyzed by AES, which was nitrided in the high-frequency induction furnace with the secondary powder and formed in the same way as of the above-described sintered body. As a result, the average nitrogen concentration was 0.0% by mass in the dielectric film and 0.0% by mass in the depth within 100 nm from the interface of the dielectric film.

COMPARATIVE EXAMPLE 2

A secondary powder having an average particle size of 200 µm, BET specific surface area of 1.2 $m^2/g$ was granulated from a primary niobium powder having an average particle size of 1 µm, BET specific surface area of 2 $m^2/g$. The secondary powder was heated in a high-frequency induction furnace and at 400° C. for one hour by passing nitrogen therethrough under atmospheric pressure and thereby nitrided.

The niobium powder taken out of the furnace was treated in the same way as in Comparative Example 1 to produce a niobium capacitor.

The result of measuring the leakage current of the obtained capacitor was 43.4 µA.

A niobium plate was nitrided in the high-frequency induction furnace with the secondary powder and analyzed by AES. As a result, the average nitrogen concentration in the depth within 50 nm from the surface was 0.7% by mass and that in the depth of 50 to 200 nm from the surface was 0.3% by mass.

Also, a niobium plate was analyzed by AES, which was nitrided in the high-frequency induction furnace with the secondary powder of Comparative Example 2 and formed in the same way as of the sintered body in Comparative Example 1. As a result, the average nitrogen concentration was 0.7% by mass in the dielectric film and 0.3% by mass in the depth within 100 nm from the interface of the dielectric film.

EXAMPLE 2

A secondary powder having an average particle size of 200 µm, BET specific surface area of 1.2 $m^2/g$ was granulated from a primary niobium powder having an average particle size of 1 µm, BET specific surface area of 2 $m^2/g$. The secondary powder was heated in a high-frequency induction furnace and at 400° C. for one hour by passing nitrogen therethrough under atmospheric pressure and thereby nitrided. After the atmosphere in the furnace was purged with argon, the niobium powder was heated at 800° C. for two hours in the furnace and part of the nitrogen localized on the surface of the niobium powder was diffused into the inside of a niobium powder. Subsequently, the furnace was kept in vacuo at 800° C. for ten minutes to diffuse the nitrogen existed near the surface of the niobium powder to the outside of the powder.

The niobium powder taken out of the furnace was treated in the same way as in Comparative Example 1 to produce a niobium capacitor.

The result of measuring the leakage current of the obtained capacitor was 9.2 µA.

A niobium plate was nitrided in the high-frequency induction furnace with the secondary powder and analyzed by AES. As a result, the average nitrogen concentration in the depth within 50 nm from the surface was 0.1% by mass and that in the depth of 50 to 200 nm from the surface was 0.3% by mass.

Also, a niobium plate was analyzed by AES, which was nitrided in the high-frequency induction furnace with the secondary powder of Example 2 and formed in the same way as of the sintered body in Comparative Example 1. As a result, the average nitrogen concentration was 0.1% by mass in the dielectric film and 0.3% by mass in the depth within 100 nm from the interface of the dielectric film.

EXAMPLE 3

A secondary powder having an average particle size of 200 µm, BET specific surface area of 1.2 $m^2/g$ was granulated from a primary niobium powder having an average particle size of 1 µm, BET specific surface area of 2 $m^2/g$. The secondary powder was heated in a high-frequency induction furnace and at 500° C. for one hour by passing nitrogen therethrough under atmospheric pressure and thereby nitrided.

The niobium powder taken out of the furnace was treated in the same way as in Comparative Example 1 to produce a niobium capacitor.

The result of measuring the leakage current of the obtained capacitor was 10.5 µA.

A niobium plate was nitrided in the high-frequency induction furnace with the secondary powder and analyzed by AES. As a result, the average nitrogen concentration in the depth within 50 nm from the surface was 1.7% by mass and that in the depth of 50 to 200 nm from the surface was 0.9% by mass.

Also, a niobium plate was analyzed by AES, which was nitrided in the high-frequency induction furnace with the secondary powder of Example 3 and formed in the same way as of the sintered body in Comparative Example 1. As a result, the average nitrogen concentration was 1.7% by mass in the dielectric film and 0.9% by mass in the depth within 100 nm from the interface of the dielectric film.

EXAMPLE 4

A secondary powder having an average particle size of 200 μm, BET specific surface area of 1.2 m$^2$/g was granulated from a primary niobium powder having an average particle size of 1 μm, BET specific surface area of 2 m$^2$/g. The secondary powder was heated in a high-frequency induction furnace and at 500° C. for one hour by passing nitrogen therethrough under atmospheric pressure and thereby nitrided. After the atmosphere in the furnace was purged with argon, the niobium powder was heated at 800° C. for two hours in the furnace and part of the nitrogen localized on the surface of the niobium powder was diffused into the inside of a niobium powder.

The niobium powder taken out of the furnace was treated in the same way as in Comparative Example 1 to produce a niobium capacitor.

The result of measuring the leakage current of the obtained capacitor was 5.8 μA.

A niobium plate was nitrided in the high-frequency induction furnace with the secondary powder and analyzed by AES. As a result, the average nitrogen concentration in the depth within 50 nm from the surface was 0.9% by mass and that in the depth of 50 to 200 nm from the surface was 0.9% by mass.

Also, a niobium plate was analyzed by AES, which was nitrided in the high-frequency induction furnace with the secondary powder of Example 4 and formed in the same way as of the sintered body in Comparative Example 1. As a result, the average nitrogen concentration was 0.9% by mass in the dielectric film and 0.9% by mass in the depth within 100 nm from the interface of the dielectric film.

EXAMPLE 5

A secondary powder having an average particle size of 200 μm, BET specific surface area of 1.2 m$^2$/g was granulated from a primary niobium powder having an average particle size of 1 μm, BET specific surface area of 2 m$^2$/g. The secondary powder was heated in a high-frequency induction furnace and at 500° C. for one hour by passing nitrogen therethrough under atmospheric pressure and thereby nitrided. After the atmosphere in the furnace was purged with argon, the niobium powder was heated at 800° C. for two hours in the furnace and part of the nitrogen localized on the surface of the niobium powder was diffused into the inside of a niobium powder. Subsequently, the furnace was kept in vacuo at 800° C. for ten minutes to diffuse the nitrogen existed near the surface of the niobium powder to the outside of the powder.

The niobium powder taken out of the furnace was treated in the same way as in Comparative Example 1 to produce a niobium capacitor.

The result of measuring the leakage current of the obtained capacitor was 3.5 μA.

The thickness of the dielectric material layer was measured and resulted in 100 nm.

A niobium plate was nitrided in the high-frequency induction furnace with the secondary powder and analyzed by AES. As a result, the average nitrogen concentration in the depth within 50 nm from the surface was 0.2% by mass and that in the depth of 50 to 200 nm from the surface was 0.9% by mass.

Also, a niobium plate was analyzed by AES, which was nitrided in the high-frequency induction furnace with the secondary powder of Example 5 and formed in the same way as of the sintered body in Comparative Example 1. As a result, the average nitrogen concentration was 0.2% by mass in the dielectric film and 0.9% by mass in the depth within 100 nm from the interface of the dielectric film.

EXAMPLE 6

A secondary powder having an average particle size of 200 μm, BET specific surface area of 1.2 m$^2$/g was granulated from a primary niobium powder having an average particle size of 1 μm, BET specific surface area of 2 m$^2$/g. The secondary powder was heated in a high-frequency induction furnace and at 600° C. for one hour by passing nitrogen therethrough under atmospheric pressure and thereby nitrided.

The niobium powder taken out of the furnace was treated in the same way as in Comparative Example 1 to produce a niobium capacitor.

The result of measuring the leakage current of the obtained capacitor was 10.9 μA.

A niobium plate was nitrided in, the high-frequency induction furnace with the secondary powder and analyzed by AES. As a result, the average nitrogen concentration in the depth within 50 nm from the surface was 5.3% by mass and that in the depth of 50 to 200 nm from the surface was 3.2% by mass.

Also, a niobium plate was analyzed by AES, which was nitrided in the high-frequency induction furnace with the secondary powder of Example 6 and formed in the same way as of the sintered body in Comparative Example 1. As a result, the average nitrogen concentration was 5.3% by mass in the dielectric film and 3.2% by mass in the depth within 100 nm from the interface of the dielectric film.

EXAMPLE 7

A secondary powder having an average particle size of 200 μm, BET specific surface area of 1.2 m$^2$/g was granulated from a primary niobium powder having an average particle size of 1 μm, BET specific surface area of 2 m$^2$/g. The secondary powder was heated in a high-frequency induction furnace and at 600° C. for one hour by passing nitrogen therethrough under atmospheric pressure and thereby nitrided. After the atmosphere in the furnace was purged with argon, the niobium powder was heated at 800° C. for two hours in the furnace and part of the nitrogen localized on the surface of the niobium powder was diffused into the inside of a niobium powder.

The niobium powder taken out of the furnace was treated in the same way as in Comparative Example 1 to produce a niobium capacitor.

The result of measuring the leakage current of the obtained capacitor was 8.8 μA.

A niobium plate was nitrided in the high-frequency induction furnace with the secondary powder and analyzed by AES. As a result, the average nitrogen concentration in the depth within 50 nm from the surface was 3.4% by mass and that in the depth of 50 to 200 nm from the surface was 3.4% by mass.

Also, a niobium plate was analyzed by AES, which was nitrided in the high-frequency induction furnace with the secondary powder of Example 7 and formed in the same way as of the sintered body in Comparative Example 1. As a result, the average nitrogen concentration was 3.4% by mass in the dielectric film and 3.4% by mass in the depth within 100 nm from the interface of the dielectric film.

EXAMPLE 8

A secondary powder having an average particle size of 200 μm, BET specific surface area of 1.2 $m^2/g$ was granulated from a primary niobium powder having an average particle size of 1 μm, BET specific surface area of 2 $m^2/g$. The secondary powder was heated in a high-frequency induction furnace and at 600° C. for one hour by passing nitrogen therethrough under atmospheric pressure and thereby nitrided. After the atomosphere in the furnace was purged with argon, the niobium powder was heated at 800° C. for two hours in the furnace and part of the nitrogen localized on the surface of the niobium powder was diffused into the inside of a niobium powder. Subsequently, the furnace was kept in vacuo at 800° C. for ten minutes to diffuse the nitrogen existed near the surface of the niobium powder to the outside of the powder.

The niobium powder taken out of the furnace was treated in the same way as in Comparative Example 1 to produce a niobium capacitor.

The result of measuring the leakage current of the obtained capacitor was 2.1 μA.

A niobium plate was nitrided in the high-frequency induction furnace with the secondary powder and analyzed by AES. As a result, the average nitrogen concentration in the depth within 50 nm from the surface was 0.5% by mass and that in the depth of 50 to 200 nm from the surface was 3.4% by mass.

Also, a niobium plate was analyzed by AES, which was nitrided in the high-frequency induction furnace with the secondary powder of Example 8 and formed in the same way as of the sintered body in Comparative Example 1. As a result, the average nitrogen concentration was 0.5% by mass in the dielectric film and 3.4% by mass in the depth within 100 nm from the interface of the dielectric film.

COMPARATIVE EXAMPLE 3

A secondary powder having an average particle size of 200 μm, BET specific surface area of 1.2 $m^2/g$ was granulated from a primary niobium powder having an average particle size of 1 μm, BET specific surface area of 2 $m^2/g$. The secondary powder was heated in a high-frequency induction furnace and at 700° C. for one hour by passing nitrogen therethrough under atmospheric pressure and thereby nitrided.

The niobium powder taken out of the furnace was treated in the same way as in Comparative Example 1 to produce a niobium capacitor.

The result of measuring the leakage current of the obtained capacitor was 163.5 μA.

A niobium plate was nitrided in the high-frequency induction furnace with the secondary powder and analyzed by AES. As a result, the average nitrogen concentration in the depth within 50 nm from the surface was 0.7% by mass and that in the depth of 50 to 200 nm from the surface was 5.1% by mass.

Also, a niobium plate was analyzed by AES, which was nitrided in the high-frequency induction furnace with the secondary powder of Comparative Example 3 and formed in the same way as of the sintered body in Comparative Example 1. As a result, the average nitrogen concentration was 0.7% by mass in the dielectric film and 5.1% by mass in the depth within 100 nm from the interface of the dielectric film.

COMPARATIVE EXAMPLE 4

A secondary powder having an average particle size of 200 μm, BET specific surface area of 1.2 $m^2/g$ was granulated from a primary niobium powder having an average particle size of 1 μm, BET specific surface area of 2 $m^2/g$. The secondary powder was heated in a high-frequency induction furnace and at 700° C. for one hour by passing nitrogen therethrough under atmospheric pressure and thereby nitrided. After the atomosphere in the furnace was purged with argon, the niobium powder was heated at 800° C. for two hours in the furnace and part of the nitrogen localized on the surface of the niobium powder was diffused into the inside of a niobium powder.

The niobium powder taken out of the furnace was treated in the same way as in Comparative Example 1 to produce a niobium capacitor.

The result of measuring the leakage current of the obtained capacitor was 84.6 μA.

A niobium plate was nitrided in the high-frequency induction furnace with the secondary powder and analyzed by AES. As a result, the average nitrogen concentration in the depth within 50 nm from the surface was 5.3% by mass and that in the depth of 50 to 200 nm from the surface was 5.3% by mass.

Also, a niobium plate was analyzed by AES, which was nitrided in the high-frequency induction furnace with the secondary powder of Comparative Example 4 and formed in the same way as of the sintered body in Comparative Example 1. As a result, the average nitrogen concentration was 5.3% by mass in the dielectric film and 5.3% by mass in the depth within 100 nm from the interface of the dielectric film.

COMPARATIVE EXAMPLE 5

A secondary powder having an average particle size of 200 μm, BET specific surface area of 1.2 $m^2/g$ was granulated from a primary niobium powder having an average particle size of 1 μm, BET specific surface area of 2 $m^2/g$. The secondary powder was heated in a high-frequency induction furnace and at 700° C. for one hour by passing nitrogen therethrough under atmospheric pressure and thereby nitrided. After the atomosphere in the furnace was purged with argon, the niobium powder was heated at 800° C. for two hours in the furnace and part of the nitrogen localized on the surface of the niobium powder was diffused into the inside of a niobium powder. Subsequently, the furnace was kept in vacuo at 800° C. for ten minutes to diffuse the nitrogen existed near the surface of the niobium powder to the outside of the powder.

The niobium powder taken out of the furnace was treated in the same way as in Comparative Example 1 to produce a niobium capacitor.

The result of measuring the leakage current of the obtained capacitor was 23.6 μA.

A niobium plate was nitrided in the high-frequency induction furnace with the secondary powder and analyzed by AES. As a result, the average nitrogen concentration in the depth within 50 nm from the surface was 0.5% by mass and that in the depth of 50 to 200 nm from the surface was 5.2% by mass.

Also, a niobium plate was analyzed by AES, which was nitrided in the high-frequency induction furnace with the secondary powder of Comparative Example 5 and formed in the same way as of the sintered body in Comparative Example 1. As a result, the average nitrogen concentration was 0.5% by mass in the dielectric film and 5.2% by mass in the depth within 100 nm from the interface of the dielectric film.

EXAMPLE 9

A secondary powder having an average particle size of 200 μm, BET specific surface area of 0.7 m²/g was granulated from a primary niobium powder having an average particle size of 2 μm, BET specific surface area of 1 m²/g. The secondary powder was heated in a high-frequency induction furnace and at 400° C. for one hour by passing nitrogen therethrough under atmospheric pressure and thereby nitrided.

The niobium powder taken out of the furnace was treated in the same way as in Comparative Example 1 to produce a niobium capacitor.

The result of measuring the leakage current of the obtained capacitor was 1.1 μA.

A niobium plate was nitrided in the high-frequency induction furnace with the secondary powder and analyzed by AES. As a result, the average nitrogen concentration in the depth within 50 nm from the surface was 0.7% by mass and that in the depth of 50 to 200 nm from the surface was 0.3% by mass.

Also, a niobium plate was analyzed by AES, which was nitrided in the high-frequency induction furnace with the secondary powder of Example 9 and formed in the same way as of the sintered body in Comparative Example 1. As a result, the average nitrogen concentration was 0.7% by mass in the dielectric film and 0.3% by mass in the depth within 100 nm from the interface of the dielectric film.

EXAMPLE 10

A secondary powder having an average particle size of 200 μm, BET specific surface area of 3 m²/g was granulated from a primary niobium powder having an average particle size of 0.5 μm, BET specific surface area of 5 m²/g. The secondary powder was heated in a high-frequency induction furnace and at 400° C. for one hour by passing nitrogen therethrough under atmospheric pressure and thereby nitrided.

The niobium powder taken out of the furnace was treated in the same way as in Comparative Example 1 to produce a niobium capacitor.

The result of measuring the leakage current of the obtained capacitor was 5.9 μA.

A niobium plate was nitrided in the high-frequency induction furnace with the secondary powder and analyzed by AES. As a result, the average nitrogen concentration in the depth within 50 nm from the surface was 0.7% by mass and that in the depth of 50 to 200 nm from the surface was 0.3% by mass.

Also, a niobium plate was analyzed by AES, which was nitrided in the high-frequency induction furnace with the secondary powder of Example 10 and formed in the same way as of the sintered body in Comparative Example 1. As a result, the average nitrogen concentration was 0.7% by mass in the dielectric film and 0.3% by mass in the depth within 100 nm from the interface of the dielectric film.

Table 1 shows the average concentration of nitrogen in the depth within 50 nm and that in the depth of 50 to 200 nm from the surface of the niobium particle and the leakage current of the niobium capacitor in the above Examples 1 to 10 and Comparative Examples 1 to 5.

TABLE 1

| Examples & Comparative Examples | Average particle size of the primary powder (μm) | Treatment of the niobium powder (temperature, time) | | | Average nitrogen concentration (% by mass) | | Leakage current (μA) |
|---|---|---|---|---|---|---|---|
| | | Under 1 atm of nitrogen | Under 1 atm of argon | In vacuo | From the surface to 50 nm | Depth from 50 to 200 nm | |
| Example 1 | 1 | 400° C., 1 hour | 800° C., 2 hours | none | 0.3 | 0.3 | 2.0 |
| Comparative Example 1 | 1 | none | none | none | 0.0 | 0.0 | 62.3 |
| Comparative Example 2 | 1 | 400° C., 1 hour | none | none | 0.7 | 0.2 | 43.4 |
| Example 2 | 1 | 400° C., 1 hour | 800° C., 2 hours | 800° C., 10 minutes | 0.1 | 0.3 | 9.2 |
| Example 3 | 1 | 500° C., 1 hour | none | none | 1.7 | 0.9 | 10.5 |
| Example 4 | 1 | 500° C., 1 hour | 800° C., 2 hours | none | 0.9 | 0.9 | 5.8 |
| Example 5 | 1 | 500° C., 1 hour | 800° C., 2 hours | 800° C., 10 minutes | 0.2 | 0.9 | 3.5 |
| Example 6 | 1 | 600° C., 1 hour | none | none | 5.3 | 3.2 | 10.9 |
| Example 7 | 1 | 600° C., 1 hour | 800° C., 2 hours | none | 3.4 | 3.4 | 8.8 |
| Example 8 | 1 | 600° C., 1 hour | 800° C., 2 hours | 800° C., 10 minutes | 0.5 | 3.4 | 2.1 |
| Comparative Example 3 | 1 | 700° C., 1 hour | none | none | 0.7 | 5.1 | 163.5 |
| Comparative Example 4 | 1 | 700° C., 1 hour | 800° C, 2 hours | none | 5.3 | 5.3 | 84.6 |
| Comparative Example 5 | 1 | 700° C., 1 hour | 800° C., 2 hours | 800° C., 10 minutes | 0.5 | 5.2 | 23.6 |
| Example 9 | 2 | 400° C., 1 hour | none | none | 0.7 | 0.3 | 1.1 |
| Example 10 | 0.8 | 400° C., 1 hour | none | none | 0.7 | 0.3 | 5.9 |

Table 1 shows that when the average concentration of nitrogen in the depth of 50 to 200 nm from the surface of the niobium particle is 0.29 to 4% by mass, the leakage current of the niobium capacitor is 10.9 μA or less. When the average concentration of nitrogen in the depth of 50 to 200 nm from the surface of the niobium particle is 0.29 to 4% by mass and that in the depth within 50 nm from the surface is 0.19 to 1% by mass, the leakage current of the niobium capacitor is 5.9 μA or less. On the other hand, when the average concentration of nitrogen in the depth of 50 to 200 nm from the surface of the niobium particle is less than 0.29% by mass or more than 4% by mass, the leakage current of the niobium capacitor is 23.6 μA or more.

This result shows that the leakage current of the niobium capacitor is reduced by nitriding the niobium powder and controlling the nitrogen concentration in the layer of 50 to 200 nm from the surface from 0.29 to 4% by mass. The leakage current of the niobium capacitor can be further reduced by controlling the average nitrogen concentration in the layer of 50 to 200 nm from the surface to 0.29 to 4% by mass and that in the depth within 50 nm from the surface to 0.19 to 1% by mass.

INDUSTRIAL APPLICABILITY

A capacitor having small amounts of leakage current can be produced by using the niobium powder having the average nitrogen concentration in the layer of 50 to 200 nm from the surface to 0.29 to 4% by mass and preferably controlling that in the depth within 50 nm from the surface to 0.19 to 1% by mass.

What is claimed is:

1. A niobium powder containing nitrogen, the niobium powder being comprised of niobium particles, wherein the average nitrogen concentration in a depth of 50 to 200 nm from the surface of the niobium particles is 0.29 to 4 mass %.

2. The niobium powder as claimed in claim 1, wherein the average nitrogen concentration in a depth within 50 nm from the surface of the particles is 0.19 to 1 mass %.

3. The niobium powder as claimed in claim 1 or 2, wherein the average particle size is from 0.1 to 1000 μm.

4. The niobium powder as claimed in any one of claim 1 or 2, wherein the BET specific surface area is from 0.5 m²/g to 40 m²/g.

5. A sintered body using the niobium powder claimed in any one of claim 1 or 2.

6. A sintered body wherein a dielectric material mainly comprising a niobium oxide is formed by anodic oxidation on the surface of the sintered body claimed in claim 5.

7. A capacitor comprising the niobium sintered body claimed in claim 5 as one electrode, a dielectric material mainly comprising a niobium oxide formed on the surface of the sintered body, and a counter electrode provided on the dielectric material.

8. The capacitor as claimed in claim 7, wherein the material of the counter electrode is at least one member selected from the group consisting of an electrolytic solution, an organic semiconductor and an inorganic semiconductor.

9. The capacitor as claimed in claim 8, wherein the material of the counter electrode is an organic semiconductor and the organic semiconductor is at least one member selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an electrically conducting polymer.

10. The capacitor as claimed in claim 9, wherein the electrically conducting polymer is at least one member selected from polypyrrole, polythiophene, polyaniline and substitution derivatives thereof.

11. The capacitor as claimed in claim 9, wherein the electrically conducting polymer is an electrically conducting polymer obtained by doping a dopant into a polymer comprising a repeating unit represented by the following formula (1) or (2):

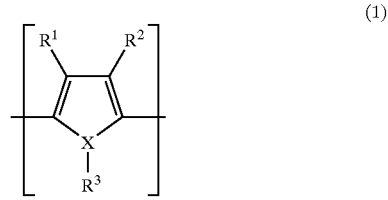

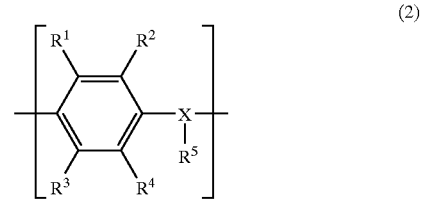

wherein $R^1$ to $R^4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains of the pair of $R^1$ and $R^2$ and the pair of $R^3$ and $R^4$ may combine to each other at an arbitrary position to form a divalent chain for forming at least one 3-, 4-, 5-, 6- or 7-membered saturated or unsaturated hydrocarbon cyclic structure together with the carbon atoms substituted by these groups; the cyclic bond chain may contain a bond of carbonyl, ether, ester, amide, sulfide, sulfinyl, sulfonyl or imino at an arbitrary position; X represents an oxygen atom, a sulfur atom or a nitrogen atom; $R^5$ is present only when X is a nitrogen atom, and independently represents hydrogen or a linear or branched, saturated or unsaturated alkyl group having from 1 to 10 carbon atoms.

12. The capacitor as claimed in claim 11, wherein the electrically conducting polymer is an electrically conducting polymer comprising a repeating unit represented by the following formula (3):

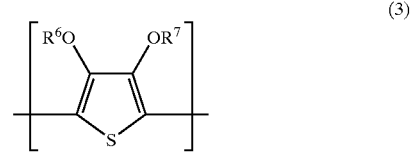

wherein $R^6$ and $R^7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements when the alkyl groups are combined with each other at an arbitrary position and the cyclic structure includes a structure having a vinylene bond which may be substituted and a phenylene structure which may be substituted.

13. The capacitor as claimed in claim 12, wherein the electrically conducting polymer is an electrically conducting polymer obtained by doping a dopant to poly(3,4-ethylenedioxythiophene).

14. The capacitor as claimed in claim 7, wherein the counter electrode is formed of an electrically conducting polymer material having a layer structure at least partially.

15. The capacitor as claimed in claim 7, wherein the counter electrode is formed of a material containing an organic sulfonate anion as a dopant.

16. A capacitor comprising a niobium sintered body as one electrode, a dielectric film mainly comprising a niobium oxide formed on the surface of the sintered body, and a counter electrode provided on the dielectric film, wherein the average nitrogen concentration is 0.29 to 4 mass% in the niobium sintered body as one electrode.

17. A capacitor as claimed in claim 16, wherein the average nitrogen concentration is 0.19 to 1 mass% in the dielectric film.

18. A method of producing the niobium powder containing nitrogen claimed in any one of claim 1 or 2, which is characterized in comprising a step of heating the niobium powder in an inert gas atmosphere.

19. The method of producing the niobium powder claimed in claim 18, comprising a step of heating the niobium powder in vacuo.

20. The method of producing the niobium powder claimed in claim 18, wherein the inert gas is argon.

* * * * *